(12) United States Patent
Sakano

(10) Patent No.: US 7,437,954 B2
(45) Date of Patent: Oct. 21, 2008

(54) SIX-AXIS FORCE SENSOR

(75) Inventor: Tetsuro Sakano, Kawasaki (JP)

(73) Assignee: FANUC Ltd, Minamitsuru-gun, Yamanashi (JP)

( * ) Notice: Subject to any disclaimer, the term of this patent is extended or adjusted under 35 U.S.C. 154(b) by 243 days.

(21) Appl. No.: 11/389,027

(22) Filed: Mar. 27, 2006

(65) Prior Publication Data

US 2006/0213287 A1  Sep. 28, 2006

(30) Foreign Application Priority Data

Mar. 28, 2005 (JP) ............................. 2005-092793

(51) Int. Cl.
*G01L 5/16* (2006.01)
(52) U.S. Cl. ............................. 73/862.044; 73/862.043
(58) Field of Classification Search ................................. 73/862.042–862.044; 177/211
See application file for complete search history.

(56) References Cited

U.S. PATENT DOCUMENTS

| | | | |
|---|---|---|---|
| 4,094,192 A | | 6/1978 | Watson et al. |
| 4,640,138 A | * | 2/1987 | Meyer et al. ............ 73/862.045 |
| 4,911,024 A | | 3/1990 | McMaster |
| 5,063,788 A | | 11/1991 | Ch'Hayder et al. |
| 5,490,427 A | | 2/1996 | Yee et al. |
| 6,324,919 B1 | * | 12/2001 | Larsen et al. ............ 73/862.043 |

FOREIGN PATENT DOCUMENTS

JP          8-122178          5/1996

OTHER PUBLICATIONS

Levi et al., "Sensoren für Roboter", Technische Rundschau, vol. 79, No. 20, May 15, 1987, pp. 108-122.

* cited by examiner

*Primary Examiner*—Edward Lefkowitz
*Assistant Examiner*—Punam Patel
(74) *Attorney, Agent, or Firm*—Drinker Biddle & Reath LLP

(57) ABSTRACT

A six-axis force sensor includes a pair of members, and at least three legs scatteringly disposed between the pair of members on the periphery of the members. Each leg includes a T-shaped leg consisting of a cross beam supported at both ends thereof by one of the pair of members and extending on the periphery of the member in a circumferential direction, and a vertical beam extending from the center of the cross beam to a direction perpendicular to the cross beam and connected to the other of the pair of members. The strains on the legs are detected by first single-axis-type strain gauges and second single-axis-type strain gauges. A first single-axis-type strain gauge is attached to a surface of the cross beam facing the side opposite to the vertical beam or a surface of the cross beam facing the vertical beam, so as to be able to detect a strain generated in the cross beam in a longitudinal axis direction thereof, and a second single-axis-type strain gauge is attached to a side surface of the vertical beam facing in a circumferential direction, so as to be able to detect a strain generated in the vertical beam in a longitudinal axis direction thereof.

8 Claims, 3 Drawing Sheets

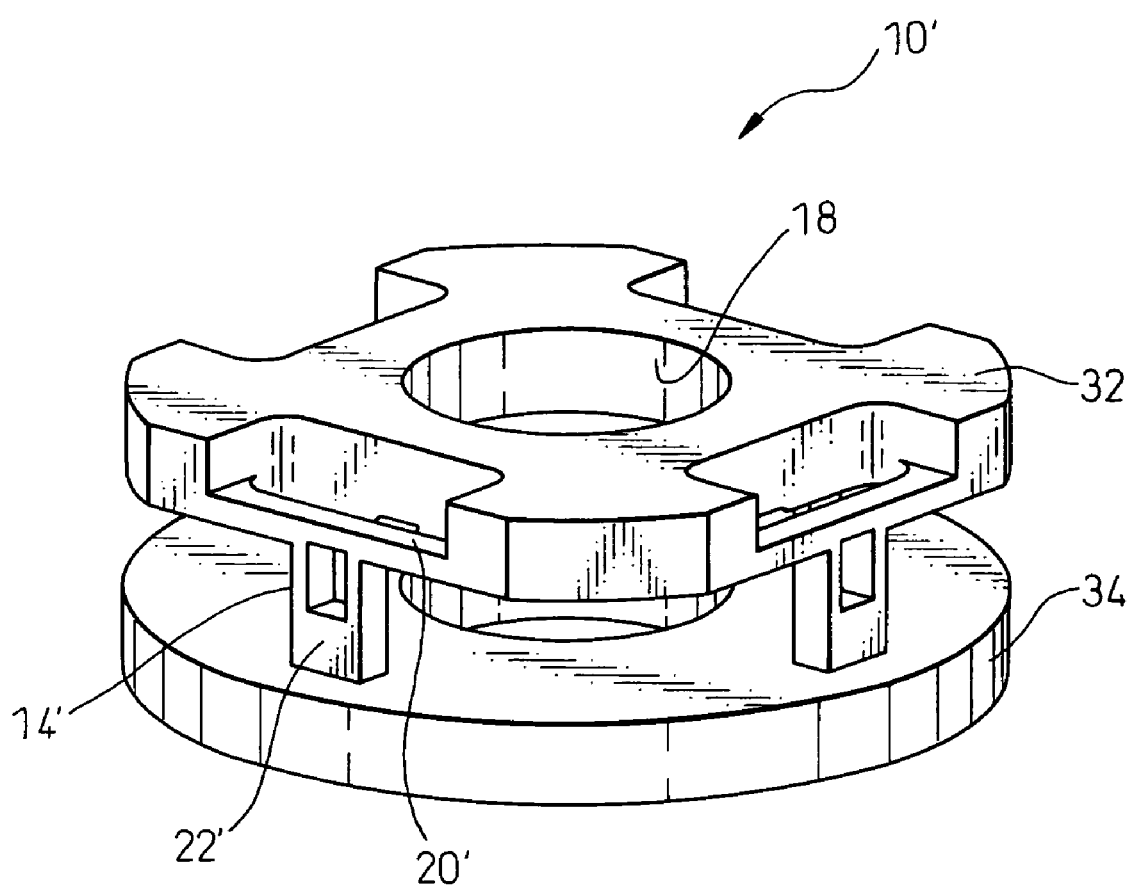

SIX-AXIS FORCE SENSOR

BACKGROUND OF THE INVENTION

1. Field of the Invention

The present invention relates to a six-axis force sensor which can measure the forces in the directions of the X-, Y- and Z-axes and the moments around the X-, Y-, and Z-axes.

2. Description of the Related Art

For example, when an external force is applied to a front end of a robot arm, a load acts on a wrist of the arm. This load consists of forces in the directions of the X-, Y-, and Z-axes, and moments around the X-, Y-, and Z-axes. In order to measure such forces and moments, it is common to use a force sensor of the type which measures loads using the strain generated in a structure due to a load.

Japanese Unexamined Patent Publication No. 8-122178 discloses an example of such a force sensor. The six-axis force sensor disclosed in Japanese Unexamined Patent Publication No. 8-122178 includes a hollow cylindrical sensor body, and three or four legs built in the sensor body. Each leg includes a first arm and a second arm, which are disposed in directions substantially perpendicular to each other to thereby form an L-shape or T-shape. A first shear strain gauge is attached to the first arm so as to mainly detect a shear strain generated in a direction perpendicular to a longitudinal axial direction of the first arm within a plane where an L-shape or T-shape is formed in the first arm, and a second shear strain gauge is attached to the second arm so as to mainly detect a shear strain generated in a direction perpendicular to a longitudinal axial direction of the second arm within a plane where an L-shape or T-shape is formed in the second arm. Shear strains generated in the plane where an L-shape or T-shape is formed in each leg are detected by the first shear strain gauge and the second shear strain gauge, thereby measuring forces in the X-, Y-, and Z-axis directions and moments around the X-, Y-, and Z-axes, based on the detected shear strains.

The six-axis force sensor detects a shear strain generated on the surface of the leg forming an L-shape or T-shape. However, in the structure of the leg, a shear strain generated on the surface of the leg forming an L-shape or T-shape is smaller than an elongation strain generated by the warpage of each arm of the leg or the like. Thus, in order to improve sensitivity of the shear strain gauge to the shearing force, a concave pocket is provided on each of the first arm and the second arm, and each shear strain gauge is fitted into each pocket.

Presence of these pockets complicates a machining process for the leg and makes it difficult to provide a small robot. The shear strain gauge has a large size because it is required in principle to be capable of measuring a strain in two directions. Further, the shear strain gauge is more expensive than a single-axis-type strain gauge.

SUMMARY OF THE INVENTION

It is therefore an object of the present invention to provide a low-cost six-axis force sensor which has a simple structure and can easily be made smaller.

In order to achieve the above object, according to the present invention, there is provided a six-axis force sensor, which includes a pair of members disposed in an opposed relation to each other, and at least three legs scatteringly disposed between the pair of members on the periphery of the member and connecting the pair of members, and which detects strains generated in the legs, due to applying a load to one of the pair of members, thereby measuring one or both of a force and a moment acting on one of the pair of members, based on the detected strains generated in the legs, wherein each leg is a T-shaped leg, the T-shaped leg consisting of a cross beam supported at both ends thereof by one of the pair of members and extending on the periphery of the member in a circumferential direction, and a vertical beam extending from the center of the cross beam in a direction perpendicular to the cross beam and connected to the other of the pair of members; and the strains of the legs are detected by a first single-axis-type strain gauge and a second single-axis-type strain gauge, the first single-axis-type strain gauge being attached to a surface of the cross beam facing the side opposite to the vertical beam or a surface of the cross beam facing the vertical beam, so as to be able to detect a strain generated in the cross beam in a longitudinal axis direction thereof, the second single-axis-type strain gauge being attached to a side surface of the vertical beam facing in a circumferential direction, so as to be able to detect a strain generated in the vertical beam in a longitudinal axis direction thereof.

In the six-axis force sensor according to the present invention, a leg for connecting the pair of members has a T-shape. Therefore, when a force or a moment making the pair of members approach each other, or move away from each other, is applied to the pair of members, the cross beam of the T-shaped leg is deflected toward one of the pair of members to thereby generate a large strain in the connection part between the vertical beam and the cross beam. When a force or a moment making one of the pair of members move laterally relative to the other member is applied to the pair of members, the vertical beam of the T-shaped leg is laterally deflected to thereby generate a strain. The six-axis force sensor according to the present invention detects the strains generated in the cross beam and the vertical beam and measures the force or the moment applied to the six-axis force sensor, based on the detected strains. Further, the six-axis force sensor according to the present invention detects the strains generated on the cross beam and the vertical beam, in the longitudinal axes thereof, respectively, and therefore, a single-axis-type strain gauge can be used as the strain gauge.

In the six-axis force sensor, the first single-axis-type strain gauge attached to the cross beam is preferably disposed at the middle between two longitudinal ends of the cross beam on the surface of the cross beam facing the side opposite to the vertical beam. The largest deflection and strain of the cross beam are generated at the middle of the cross beam in the longitudinal axis direction thereof. Therefore, attachment of the six-axis force sensor to the middle of the cross beam in the longitudinal axis direction thereof can improve strain detection sensitivity. The first single-axis-type strain gauge attached to the cross beam may be disposed at one or both of two longitudinal ends of the cross beam on the surface of the cross beam facing the vertical beam.

In the six-axis force sensor, the legs are preferably disposed along the circumference of one circle. In this case, the cross beam of each leg may extend along the circumference of the circle or extend tangentially to the circle.

Preferably, the vertical beam of each leg is formed with an opening extending through the vertical beam in a radial direction of the circle. In the case where the vertical beam is thus formed with the opening, a deflection is easily generated on the vertical beam in a circumferential direction of the circle or in a tangential direction of a circle. As a result, sensitivity of the six-axis force sensor to a force and a moment can be improved.

Preferably, the pair of members and the legs are integrated with each other. In the case where the pair of members and the legs are integrated with each other, an assembling process can be advantageously eliminated.

Preferably, the single-axis-type strain gauge is a semiconductor-type strain gauge. The semiconductor-type strain gauge can detect strains with a sensitivity higher than a metal foil gauge or the like. Therefore, when a semiconductor-type strain gauge is used as a single-axis-type strain gauge, the force detection resolution of the six-axis force sensor can be improved. As a smaller strain can be detected, a smaller deflection of the legs may be detected. As a result, the strength of the legs can be improved, and a six-axis force sensor having a stronger structure can be provided.

The simple shape of the T-shaped leg makes it easier to machine the legs by cutting machining or wire electric discharge machining, thereby contributing to a decreased manufacturing cost. A single-axis-type strain gauge is smaller and cheaper than a shear strain gauge and, even if the T-shaped leg is made smaller, the machining of the leg is still easy. Therefore, a small six-axis force sensor can be provided at low cost.

BRIEF DESCRIPTION OF THE DRAWINGS

The above and other objects, features and advantages of the present invention will be described below in more detail based on the preferred embodiments of the present invention with reference to the accompanying drawing, wherein:

FIG. 5 is a perspective view of a six-axis force sensor according to a second embodiment of the present invention.

DETAILED DESCRIPTIONS

Several preferred embodiments of the present invention will be described below with reference to the accompanying drawings.

Figure 1:
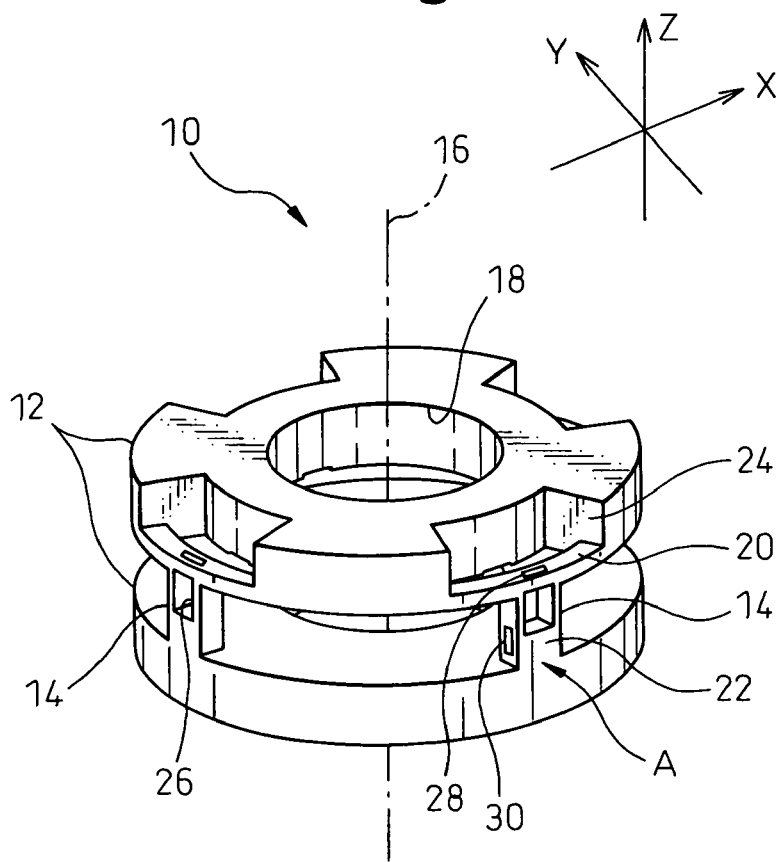
FIG. 1 is a perspective view of a six-axis force sensor according to a first embodiment of the present invention.

FIG. 1 is a perspective view of a six-axis force sensor according to a first embodiment of the present invention. Referring to FIG. 1, a six-axis force sensor 10 includes a pair of disc-shaped members 12 disposed in opposed relation to each other, and legs 14 disposed between the pair of disc-shaped members 12 and connecting the two disc-shaped members 12.

The pair of disc-shaped members 12 are arranged so that the center axes 16 thereof are aligned in one straight line. The pair of disc-shaped members 12 are mounted to different structures (not shown) and, for example, are positioned at both sides of a joint of a robot. The disc-shaped member 12 is formed at the center thereof with a through-hole 18 extending along the center axis 16 thereof. In the through-hole 18, a portion connecting the different structures such as parts of a joint of a robot can be disposed.

The legs 14 are disposed at equal intervals along a circumference of the virtual circle around the center axis 16 on the periphery of each disc-shaped member 12, between the pair of disc-shaped members 12. In the embodiment shown in FIG. 1, four legs 14 are provided and are arranged at the interval of 90 degrees on the virtual circle around the center axis 16 on the periphery of each disc-shaped member 12. Each leg 14 includes a cross beam 20 extending along the virtual circle around the center axis 16, and a vertical beam 22 extending from the center of the cross beam 20 in a direction substantially perpendicular to a longitudinal axis of the cross beam 20. A fan-shaped notch 24 is formed on the external periphery of one (i.e., an upper disc-shaped member in FIG. 1) of the pair of disc-shaped members 12. Both ends of the cross beam 20 of the leg 14 are connected to and supported by both side surfaces of the notch 24. The other end of the vertical beam 22 extending from the cross beam 20 is connected to the other (i.e., a lower disc member in FIG. 1) of the pair of disc-shaped members 12.

The vertical beam 22 of the leg 14 is formed with an opening 26 extending therethrough in a radial direction of the virtual circle, so that the vertical beam 22 can be easily deflected in a circumferential direction or in a tangential direction of the virtual circle. This results in a relative large deflection in the circumferential direction or tangential direction of the virtual circle, when even a small load acts on the six-axis force sensor 10. On the other hand, the remaining part of the vertical beam 22 has a large cross-sectional area, thereby resulting in an increased strength of the vertical beam.

Figure 4:
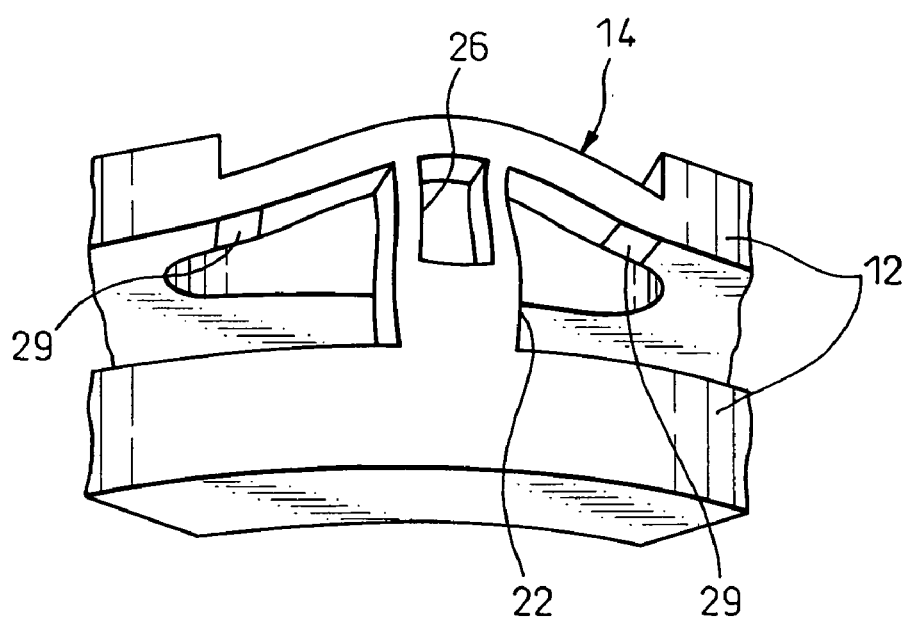
FIG. 4 is a perspective view of the leg of the six-axis force sensor shown in FIG. 1, as viewed from a lower side, showing another example of positions where single-axis-type strain gauges for cross beam are attached.

A single-axis-type strain gauge 28 for the cross beam is attached to a surface of the cross beam 20 facing the side opposite to the vertical beam 22 at a position opposed to the vertical beam 22 (that is, the center of the upper surface of the cross beam 20) in order to mainly detect a strain generated on the cross beam 20 in a longitudinal axis direction of the cross beam 20 (that is, in the circumferential direction of the virtual circle). However, in addition to, or in place of, the single-axis-type strain gauge 28 for a cross beam, a single-axis-type strain gauge 29 for a cross beam may be attached to the surface of the cross beam 20 facing the vertical beam at either one or both of the longitudinal ends of the cross beam, as shown in FIG. 4. A single-axis-type strain gauge 30 for a vertical beam is attached to the side surface of the vertical beam 22 facing in the circumferential direction of the virtual circle, in order to mainly detect a strain generated on the vertical beam 22 in a longitudinal axis direction of the vertical beam 22. The single-axis-type strain gauge 30 for a vertical beam may be attached to only one of, or both of, the side surfaces of the vertical beam 22 facing in the circumferential direction of the virtual circle. In the embodiment shown in FIG. 1, the single-axis-type strain gauge 30 for a vertical beam is attached to only one of the side surfaces of the vertical beam 22.

A metal-foil-type strain gauge or a semiconductor-type strain gauge can be used as the single-axis-type strain gauge. However, as a semiconductor-type strain gauge generally has a higher strain detection sensitivity than the metal-foil-type strain gauge and can detect a smaller strain, it is preferable to use a semiconductor-type strain gauge in order to increase detection resolution of the six-axis force sensor 10. As the semiconductor-type strain gauge can also detect a small strain and can detect a smaller strain generated in the leg 14 under the same load, the semiconductor-type strain gauge has an advantage of allowing the leg 14 to have a tougher and stronger structure. In the case where the six-axis force sensor 10 is mounted on the wrist of the arm of a robot, the arm may be collided against an object, thereby applying large load to the wrist. In this case, in order to avoid destruction, a tougher structure of the six-axis force sensor 10 has an important advantage.

The term "single-axis-type strain gauge" refers to a strain gauge for mainly detecting a strain generated in a direction along one axis. On the other hand, the term "shear strain gauge" refers to a strain gauge of a structure wherein, in order to measure strains in directions along two axes, one or more measuring elements such as a single-axis-type strain gauge are disposed at an angle of 45 degrees relative to a direction of shearing force to be measured. The shear strain gauge is of a larger size and more expensive than the single-axis-type strain gauge. Therefore, in order to manufacture a small six-axis force sensor at lower cost, the use of the single-axis-type strain gauge, as in the present application, is effective.

Although the cross beam 20 and the vertical beam 22 in the embodiment shown in FIG. 1 are bent along the virtual circle, the extent of the bend is so slight that it has little effect on the cross beam 20 and the vertical beam 22 and it does not make it hard to deflect them. On the other hand, when the cross beam 20 and the vertical beam 22 are bent along the virtual circle, a six-axis force sensor 10 of an integral construction can be manufactured from one cylindrical body having the same outline as that of the virtual circle, by cutting or wire electric discharge machining. The six-axis force sensor 10 having such an integral construction is advantageous in that fewer assembling steps are required and a step of accurately arranging the legs 14 is eliminated. However, if it is desired to decrease the effect which the bending of the cross beam 20 and the vertical beam 22 has on the deflection to thereby improve detection sensitivity to a force and a moment, legs 14', each consisting of a linear cross beam 20' and a liner vertical beam 22', can be disposed at equal intervals along the virtual circle, as shown in FIG. 5. The six-axis force sensor 10' shown in FIG. 5 can be manufactured, for example, by preparing an integrated structure having one (i.e., a square member) 32 of the opposing members and the legs 14' integrated with each other, from a rectangular solid material, by way of cutting or wire electric discharge machining, and connecting the integrated structure with a disc-shaped member 34 prepared separately, by means of bolts or the like.

While the legs 14, 14' are disposed at equal intervals along the virtual circle in the above embodiment, the legs 14, 14' may be also scatteringly disposed at any intervals on the periphery of the members 12, 32, 34. The pair of members can have a square shape or other shape, instead of the disc-shape, as shown in FIG. 5. Although the six-axis force sensor 10 or 10' includes the four legs 14 or 14' in the above embodiments, a six-axis force sensor according to the present invention may include at least three legs, so long as six linearly independent outputs are obtained from single-axis-type strain gauges attached to the legs.

Figure 2:
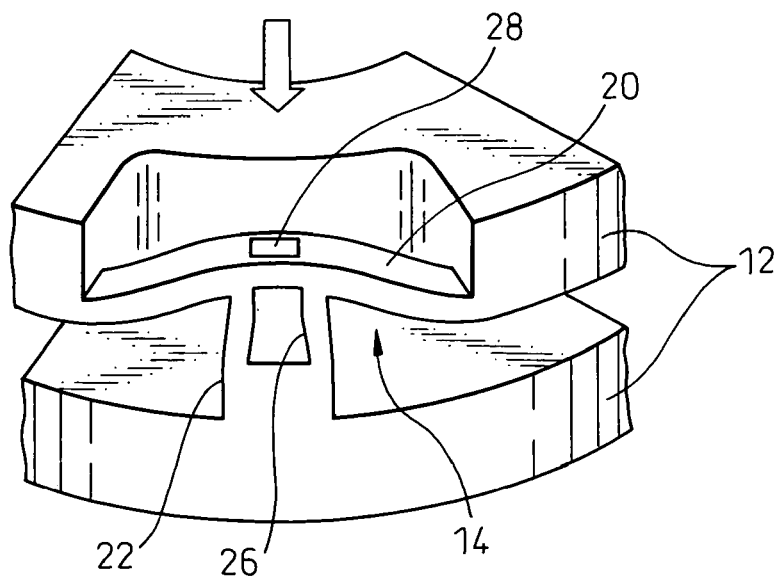
FIG. 2 is an enlarged view of a leg of the six-axis force sensor shown in FIG. 1, showing a state that a cross beam is deflected by load being applied thereon in a direction to make a pair of members approach to each other.

In the six-axis force sensor 10 shown in FIG. 1, both ends of the cross beam 20 of the leg 14 are supported by one of the pair of disc-shaped member 12. Therefore, when a force is applied to the leg 14 in the Z-axis direction, the cross beam 20 of the leg 14 is forced by the vertical beam 22 connected to the other disc-shaped member 12 and is thereby deflected in the Z-axis direction. For example, when a force is applied to the leg 14 so as to make the pair of disc-shaped members 12 approach to each other in the Z-axis direction, the cross beam 20 of the leg 14 is deflected, upward as viewed in FIG. 2, in the Z-axis direction as shown in FIG. 2. The strain gauge 28 for a cross beam mainly detects a strain generated on the surface of the cross beam 20 in the longitudinal axis direction of the cross beam 20 due to the deflection of the cross beam 20. Such a force generates a strain in the longitudinal axis direction of the vertical beam 22 on the vertical beam 22 of the leg 14.

However, this strain is much smaller than that generated in the longitudinal axis direction of the cross beam 20 on the cross beam 20. As the cross beam 20 is supported at both ends thereof by the disc-shaped member 12 and is pushed at the center thereof by the vertical beam 22, the amount of deflection of the cross beam 20 is largest at the center of the cross beam 20 and strain is also largest at the center of the cross beam 20. Therefore, attachment of the strain gauge 28 for a cross beam to the center of the cross beam 20 allows the strain gauge 28 to detect a larger strain when the same force is applied, thereby achieving an effect of improving the sensitivity, of the six-axis force sensor 10, to a load.

Figure 3:
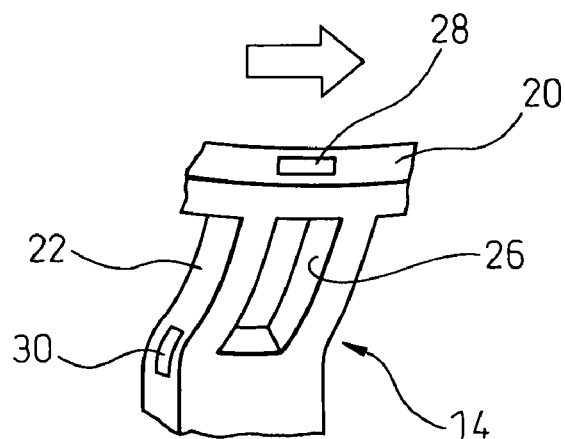
FIG. 3 is an enlarged view of the leg of the six-axis force sensor shown in FIG. 1, showing a state that a vertical beam is deflected by load being applied thereon in a direction to make the pair of members move relative to each other in opposite lateral directions.

On the other hand, when a force is applied to the leg 14 of the six-axis force sensor 10 in a circumferential direction or a tangential direction of the virtual circle, the vertical beam 22 of the leg 14 is deflected in the direction of the force. For example, when a force in the X-axis direction is applied to the leg 14 at a position thereof designated by a reference character A in the six-axis force sensor shown in FIG. 1, a force in the same direction (i.e., the right direction in FIG. 3) along the X-axis is applied to the vertical beam 22 of the leg 14 via the cross beam 20, and the vertical beam 22 is deflected, as shown in FIG. 3. The strain gauge 30 for a vertical beam mainly detects a strain generated on the surface of the vertical beam 22 in the longitudinal axis direction of the vertical beam 22 due to the deflection of the vertical beam 22. Such a force generates a strain, in the longitudinal axis direction of the cross beam 20, on the cross beam 20. However, this strain is much smaller than that generated on the vertical beam 22. As the vertical beam 22 is formed with the opening 26 extending therethrough in a radial direction of the virtual circle, the vertical beam 22 is easily deflected by the load in the tangential direction of the virtual circle. Therefore, the opening makes the vertical beam 22 generate a strain larger than that generated by the same load, thereby achieving an effect improving the sensitivity, of the six-axis force sensor 10, to a load.

When a force in a radial direction of the virtual circle is applied to the leg 14 of the six-axis force sensor 10, the vertical beam 22 is deflected in the same direction as that of the applied force. As a single-axis-type strain gauge 30 for a vertical beam is attached to a side surface facing in the circumferential direction of the vertical beam 22, the single-axis-type strain gauge 30 for a vertical bema generates a large output when a strain is generated by the deflection of the vertical beam 22 in the circumferential direction of the vertical beam 22. However, the single-axis-type strain gauge 30 for a vertical beam generates a relatively smaller output when a strain is generated by the deflection of the vertical beam 22 in the radial direction of the virtual circle.

It should be noted that such a force in the Z-axis direction also acts on the leg 14 due to a component of moment around the X-axis or the Y-axis and that such a force in the circumferential direction of the virtual circle also acts on the leg 14 due to a component of moment around the Z-axis.

Based on the above-mentioned operation principle, it will be appreciated that a force in the Z-axis direction corresponds to the case where the single-axis-type strain gauges 28 for cross beams of the cross beams 20 of the legs 14 generate outputs larger than the other strain gauges and all of their outputs are substantially equal and that a force in the X-axis direction or the Y-axis direction corresponds to the case where the single-axis-type strain gauges 30 for vertical beams of the vertical beams 22 of the legs 14 generate outputs larger than the others and their outputs are not equal. It will be appreciated that a moment around the Z-axis corresponds to the case where the single-axis-type strain gauge 30 for a vertical beam of the vertical beams 22 of the legs 14 generate outputs larger than the others and all of their outputs are substantially equal and that a moment around the X-axis or Y-axis corresponds to the case where the single-axis-type strain gauges 28 for cross beams of the cross beams 20 of only two legs 14 radially opposing to each other of the four legs 14 generate outputs larger than the others and the absolute values of the two outputs are substantially equal.

However, complicated forces and/or moments including force components in one or more axis directions and/or moment components around one or more axes are actually applied to the six-axis force sensor 10. Therefore, the six-axis force sensor 10 according to the present invention also converts strains detected by the single-axis-type strain gauges 28 and 30 into forces and moments applied to the six-axis force sensor 10, based on a correlation between forces and strains obtained by a method as described in Japanese Unexamined Patent Publication No. 8-122178. A calibration method used to obtain a correlation between forces and strains will be described below.

When F denotes load (consisting of force vector and moment vector) applied to the six-axis force sensor 10, v denotes an output (voltage) from the single-axis-type strain gauges 28 and 30, and C notes a calibration matrix, the following equation is established.

$$F = Cv \quad \text{(equation 1)}$$

$$F = \begin{bmatrix} F_x \\ F_y \\ F_z \\ M_x \\ M_y \\ M_z \end{bmatrix}$$

$$C = \begin{bmatrix} C_{11} & C_{12} & \cdots & C_{1n} \\ C_{21} & \ddots & & \vdots \\ \vdots & & \ddots & \vdots \\ C_{61} & \cdots & \cdots & C_{6n} \end{bmatrix}$$

$$v = \begin{bmatrix} v_1 \\ v_2 \\ \vdots \\ v_n \end{bmatrix}$$

In the above equation, n denotes a total number of the single-axis-type strain gauges 28 and 30 in the six-axis force sensor 10, i.e. a sum of a total number of the single-axis-type strain gauges 28 for cross beams and a total number of the single-axis-type strain gauges 30 for vertical beams in the six-axis force sensor 10. Further, Fx, Fy, and Fz denote values of a force in the X-axis direction, a force in the Y-axis direction, and a force in the Z-axis direction, respectively; Mx, My, and Mz denote values of moment around the X-axis direction, moment around the Y-axis direction, and moment around the Z-axis direction, respectively; and $v_1, \ldots,$ and $V_n$ denote values of outputs from the single-axis-type strain gauges 28 and 30. The calibration matrix means a matrix by which the outputs of the single-axis-type strain gauges 28 and 30 are multiplied to give an actually applied load.

The calibration matrix C is obtained by first experimentally obtaining a plurality sets of outputs from the single-axis-type strain gauges 28 and 30 when known loads are applied, i.e. relationships between known F and v and, then, using the equation (1) and a least-square method as, for example, described in Japanese Unexamined Patent Publication No. 8-122178. The method of obtaining the calibration matrix using the least-square method is well-known, and, therefore, will not be explained in detail. When the calibration matrix C is thus obtained and becomes known one, a force and a moment acting on the six-axis force sensor 10 can be obtained from the outputs of the single-axis-type strain gauges 28 and 30 by using the equation (1).

While the above-mentioned principle of measuring a force and a moment has been described based on the six-axis force sensor 10 shown in FIG. 1, this measurement principle can be similarly applied to the six-axis force sensor 10' shown in FIG. 5. Further, in the case where the six-axis force sensor includes three or five or more legs 14, the basic operation principle of the six-axis force sensor is the same and the calibration matrix C can be obtained in a similar manner to the above by changing the number of n in the above description.

What is claimed is:

1. A six-axis force sensor comprising a pair of members disposed in an opposed relation to each other, and at least three legs scatteringly disposed between the pair of members on the periphery of the member and connecting the pair of members, said six-axis force sensor detecting strains generated in the legs, due to applying a load to one of the pair of members, thereby measuring one or both of a force and a moment acting on said one of the pair of members, based on the detected strains generated in the legs, wherein each leg comprises a T-shaped leg, said T-shaped leg consisting of a cross beam supported at both ends thereof by one of the pair of members and extending on the periphery of the member in a circumferential direction, and a vertical beam extending from the center of the cross beam in a direction perpendicular to the cross beam and connected to the other of the pair of members; and said strains of the legs are detected by a first single-axis-type strain gauge and a second single-axis-type strain gauge, said first single-axis-type strain gauge being attached to a surface of the cross beam facing the side opposite to the vertical beam or a surface of the cross beam facing the vertical beam, so as to be able to detect a strain generated in the cross beam in a longitudinal axis direction thereof, said second single-axis-type strain gauge being attached to a side surface of the vertical beam facing in a circumferential direction, so as to be able to detect a strain generated in the vertical beam in a longitudinal axis direction thereof.

2. The six-axis force sensor according to claim 1, wherein the first single-axis-type strain gauge attached to the cross beam is disposed at the middle between two longitudinal ends of the cross beam on the surface of the cross beam facing the side opposite to the vertical beam.

3. The six-axis force sensor according to claim 1, wherein the first single-axis-type strain gauge attached to the cross beam is disposed at one or both of two longitudinal ends of the cross beam on the surface of the cross beam facing the vertical beam.

4. The six-axis force sensor according to claim 1, wherein the legs are disposed along the circumference of one circle, and the cross beam of each leg extends along the circumference of the circle.

5. The six-axis force sensor according to claim 1, wherein the legs are disposed along the circumference of one circle, and the cross beam of each leg extends tangentially on the circle.

6. The six-axis force sensor according to claim 1, wherein the legs are disposed along the circumference of one circle, and the vertical beam of each leg is formed with an opening extending through the vertical beam in a radial direction of the circle.

7. The six-axis force sensor according to claim 1, wherein the pair of members and the legs are integrated with each other.

8. The six-axis force sensor according to claim 1, wherein the single-axis-type strain gauge comprises a semiconductor-type strain gauge.

* * * * *